United States Patent Office 3,206,282
Patented Sept. 14, 1965

3,206,282
REMOVAL OF SOLUBLE AFTER-PRECIPITATE FROM CONCENTRATED PHOSPHORIC ACID
Robert J. Crawford, Wilmington, Richard Sobel, Claymont, and George Hebbel, Wilmington, Del., assignors to Allied Chemical Corporation, New York, N.Y., a corporation of New York
No Drawing. Filed Feb. 20, 1962, Ser. No. 174,411
4 Claims. (Cl. 23—165)

This invention relates to the treatment of phosphoric acid and more particularly refers to a new and improved process for the removal of "after-precipitate" from concentrated phosphoric acid.

Phosphoric acid by the so called wet process is conventionally produced by digesting phosphate rock with sulfuric acid which reacts to form phosphoric acid of a concentration of about 35% by weight, and gypsum which is insoluble in the reaction products. The gypsum is separated from the phosphoric acid by the usual means such as filtration or settling or both and the resultant weak acid is often used as an article of commerce. For many important commercial uses such as for example production of liquid fertilizer, it is desired to obtain a more concentrated phosphoric acid of the order of 60–85% by weight concentration, more generally about 75% by weight phosphoric acid concentration. To obtain more concentrated phosphoric acid the weak phosphoric acid of about 35% by weight phosphoric acid concentration is subjected to vacuum evaporation until the desired concentration of phosphoric acid within the range of about 60–85% by weight is obtained. Rock phosphate, a natural mineral material, contains a number of impurities such as iron, aluminum, silicon and fluorine which are soluble in phosphoric acid and remain in solution in both the weak and the concentrated phosphoric acid. These impurities were of little or no moment in the production of weak phosphoric acid since they did not precipitate out. Unfortunately, however, the presence of these soluble impurities in strong phosphoric acid caused serious problems. From practical experience, it was found that although a clear strong phosphoric acid was produced from the process, nevertheless, upon standing these soluble impurities gradually and continuously precipitated as solid material from the clear solution which caused difficulties in storage cars, tank cars and caused clogging of lines and valves. These soluble impurities are termed "after-precipitate" and when in solution in strong phosphoric acid are called soluble after-precipitate and when out of solution are called solid after-precipitate or after-precipitate solids. The after-precipitates are of apparently complex structure, containing several impurities such as silicon, magnesium, zinc, calcium, fluorine and copper but predominantly compounds of aluminum and iron, although the term "compound" as used is not employed in its technical sense, since definite proof has not yet been developed that these products are compounds technically. Concentrated phosphoric acid normally contains an appreciable amount of soluble after-precipitate of the order of 2–5%, by weight of the phosphoric acid. So troublesome was the problem of after-precipitate that the strong phosphoric acid was held in large storage tanks in a quiescent condition for long periods of time of a month or more to permit a portion of the soluble after-precipitate to settle in the bottom of the tank as after-precipitate solids. Of course this procedure was inefficient and expensive entailing capital investment of large storage tanks and the maintenance of large inventories.

An object of the present invention is to provide an efficient, economical method of rapidly removing soluble after-precipitate from strong phosphoric acid. Another object of the present invention is to provide a purified strong phosphoric acid by removal of after-precipitate from the acid. Other objects and advantages will be apparent from the following description.

At first efforts were made to treat the strong phosphoric acid with chemicals to retain the after-precipitate therein in solution. Such procedure was found unsatisfactory because it not only was expensive but made a more impure acid. Experimentation was conducted in an effort to remove the soluble after-precipitate, but without material success except that partial removal was achieved by permitting phosphoric acid to remain in storage tanks in a quiescent state for long periods of time in the order of one month or more. In the course of our experimentation, we deliberately added after-precipitate solids obtained from a previous mixture to clear concentrated phosphoric acid and maintained the after-precipitate solids dispersed throughout the clear phosphoric acid solution with agitation for a short period of about 30 hours. Upon filtration and separation of the mixture of these suspended solids in phosphoric acid we surprisingly discovered an increase in the amount of solids which normally would be expected to precipitate from the clear phosphoric acid and upon analysis found that this increase in the solids removal resulted from the impurities originally present in the concentrated phosphoric acid. The removal of soluble after-precipitate impurity from the phosphoric acid solution by deliberately adding the same impurity to the phosphoric acid solution was confirmed by repeated tests. We cannot satisfactorily explain why the addition of impurities in the form of after-precipitate solids to concentrated phosphoric acid containing after-precipitate would cause removal of impurities originally present in the phosphoric acid, except perhaps by theorizing that the impure compounds in the phosphoric acid are complex, unstable mixtures of compounds which while under the influence of dispersed after-precipitate solids causes these complex unstable compounds to break down and precipitate. Regardless of the theory or phenomenon involved we found in large scale operation that in fact, removal of these complex solid impurities can be effectively accomplished in a matter of hours as contrasted with a month or more of maintaining the phosphoric acid in a quiescent state in large storage tanks.

In accordance with the present invention, soluble after-precipitate can be rapidly and conveniently removed from 60–85% by weight concentrated phosphoric acid containing the same by dispersing in the concentrated phosphoric acid containing soluble after-precipitate solid after-precipitate in an amount of at least ½ to 8% by weight, or more, preferably 2–5% by weight of the concentrated phosphoric acid, maintaining solid after-precipitate dispersed in the concentrated phosphoric acid for 10 to 48 hours or more, preferably about 20–36 hours, to effect removal of at least a major portion of the soluble after-precipitate in the phosphoric acid, maintaining the temperature during dispersion of solid after-precipitate within the range of about 30°–120° F., preferably about 70°–95° F., and thereafter separating the after-precipitate solids from the concentrated phosphoric acid.

The invention, in operation can be practiced either batchwise or in a continuous manner. Batch operation may be conveniently carried out by disposing concentrated phosphoric acid containing soluble after-precipitate in a tank, adding a few percent of solid after-precipitate to the concentrated phosphoric acid such after-precipitate having been previously produced as for example by collecting after-precipitate which has settled from phosphoric acid after standing in a quiescent state for a long time, maintaining the after-precipitate solids dispersed in the concentrated phosphoric acid by any suitable means, for instance a stirrer, to agitate the contents for about 20–36 hours to cause the soluble after-precipitate to become insoluble in the concentrated phosphoric acid, and separating the solid after-precipitate as by filtration to produce a purified phosphoric acid. The separated after-precipitate solids can be used for treating a succeeding batch of concentrated phosphoric acid. In continuous operation, a body of concentrated phosphoric acid containing dispersed solid after-precipitate is maintained in a tank, concentrated phosphoric acid feed is continuously added to the tank, treated acid containing suspended solid after-precipitate is continuously withdrawn from the tank and the after-precipitate solids separated from the purified phosphoric acid, and solid after-precipitate from the same operation or different operation added as a solid or for convenience in pumping as a slurry maintained dispersed in the phosphoric acid in the proper concentration of about 2–5% by weight for an average retention time in the tank of about 20–36 hours sufficient to cause the soluble after-precipitate in the phosphoric acid to become insoluble. The treatment tank which contains the concentrated phosphoric acid should be acid resistant and equipped to continually permit introduction of clear phosphoric acid while allowing a constant discharge of a substantially equal volume of a mixture of phosphoric acid and solid after-precipitate. A convenient manner of accomplishing this is to provide a discharge outlet in the treatment tank which is positioned such that upon the introduction of clear concentrated phosphoric acid to the tank, a corresponding volume of treated acid plus after-precipitate overflows from the tank. By this procedure, the acid level in the treatment tank can be maintained at a constant level and further the average retention time of the concentrated phosphoric acid in the treatment tank can be closely regulated. The treatment tank should also be equipped with means for agitating the phosphoric acid so as to provide a constant dispersion of after-precipitate solids in the concentrated phosphoric acid. Agitation at the point where the after-precipitate solids are introduced into the tank secures efficient dispersion of after-precipitate solids in the concentrated phosphoric acid. Satisfactory dispersion of the solids according to the process of the present invention can be accomplished by any suitable apparatus such as a forced circulating device disposed within the treatment tank or by a turbine type agitator equipped with stirrers or blades which serves to continuously agitate the phosphoric acid in the treatment tank or in continuous operation by continually withdrawing a portion of phosphoric acid by any suitable pumping apparatus and forcing this withdrawn portion back into the body of the phosphoric acid thereby creating a surging action in the body of the phosphoric acid which serves to disperse the after-precipitate solids contained therein.

Procedurally, the concentrated phosphoric acid feed which may contain trace amounts of gypsum is fed to the treatment tank and the treated phosphoric acid plus after-precipitate solids is withdrawn at such a rate that the average retention time of the phosphoric acid in the treatment tank is in the order of about 10 to 48 hours. The amount of after-precipitate solids dispersed to cause the soluble after-precipitate impurities in the phosphoric acid to become insoluble can be varied somewhat but should be at least about ½% by weight based on the weight of phosphoric acid and may reach as high as 8% or more with optimum results being obtainable when the solid after-precipitate dispersed in the phosphoric acid is from about 2 to 5% by weight. No significant advantage is obtained when the solid concentration dispersed in phosphoric acid is greatly in excess of 5% by weight.

The operation is conducted below 120° F. to as low as 30° F., preferably within a range of 70°–95° F. Temperatures appreciably in excess of 120° F. or below 30° F. tend to retard the conversion of the soluble after-precipitate in the phosphoric acid solution to the insoluble form and are therefore not desirable. The temperature may be readily maintained within this range by any suitable procedure such as by passing a cooling or heating medium through a coil immersed in phosphoric acid to abstract or add heat by heat exchange with the phosphoric acid. After the overflow slurry consisting of phosphoric acid plus solid after-precipitate is withdrawn from the treatment tank, it is subjected to further processing whereby the after-precipitate solids are separated as a slimy amorphous material from the phosphoric acid. Treatment of concentrated phosphoric acid in accordance with the present invention results in removal of a major portion of the soluble after-precipitate from the phosphoric acid, generally removal of ¾ or more of the soluble after-precipitate is converted to the insoluble form. The purified phosphoric acid can be shipped in tank cars; storage cars, pumped through lines and valves and used in the production of liquid fertilizer without difficulty.

*Example 1*

75% phosphoric acid by weight was produced by (1) digesting phosphate rock and sulfuric acid to 35% by weight phosphoric acid and gypsum and then after removing the gypsum by filtration (2) the acid was concentrated to 75% by weight phosphoric acid. The concentrated acid which contained about 4.5% by weight solids in suspension, primarily gypsum ($CaSO_4 \cdot 2H_2O$) was settled in a continuous settler to remove the suspended solids. The 75% phosphoric acid containing 3.2% by weight soluble after-precipitate was fed to a steel, lead-lined, brick-lined treatment tank 5 feet in diameter and 9 feet high, together with about 3% by weight after-precipitate solids from a previous operation. The phosphoric acid charge was fed on the surface which was 3 feet below the top of the tank and a 6 foot acid level was maintained by an overflow which discharged the product plus dispersed solid-after-precipitate. The tank was agitated continuously by a turbine type, 45° angle, 8 blade agitator, 18 inches in diameter driven by a 3 horsepower motor. A coil of 60 feet lead pipe, 1 inch in diameter, 1½ inches O.D., submerged in the acid plus a total of 9 feet of leads also submerged in the acid was used for cooling by passage of river water through the coils. The phosphoric acid feed rate was controlled for a nominal retention time of 36 hours in the 5′ x 9′ tank. During this period, the temperature of the acid in the 5′ x 9′ tank was controlled at an average of 84° F. by circulating cool water through the coils. Clarified phosphoric acid was separated from the overflow product, which consisted of a slurry of after-precipitate solids in phosphoric acid. 72% by weight of the amount of soluble after-precipitate initially present in the concentrated phosphoric acid feed was removed.

*Example 2*

Using the equipment of Example 1, the procedure was similar except that the soluble after-precipitate contained in the phosphoric acid feed was 2.56% by weight and the nominal retention time 24 hours. The clarified phosphoric acid showed that 64% of the soluble after-precipitate initially present in the phosphoric acid feed was removed.

Although certain preferred embodiments of the invention have been disclosed for purpose of illustration, it will be evident that various changes and modifications may be made therein without departing from the scope and spirit of the invention.

We claim:

1. A process for the purification of concentrated phosphoric acid containing soluble after-precipitate impurities which comprises dispersing solid after-precipitate in 60–85 percent by weight concentrated phosphoric acid containing soluble after-precipitate impurities in an amount of at least one-half percent solid after-precipitate impurities by weight of the concentrated phosphoric acid, maintaining solid after-precipitate dispersed in the concentrated phosphoric acid for at least 10 hours to convert in excess of 60% by weight of the soluble after-precipitate in the phosphoric acid to after-precipitate solids, maintaining the temperature of the dispersion of solid after-precipitate in concentrated phosphoric acid during conversion of the soluble form to after-precipitate solids within the range of about 30–120° F., and separating the after-precipitate solids from the purified concentrated phosphoric acid.

2. A process for the purification of concentrated phosphoric acid containing soluble after-precipitate impurities which comprises dispersing solid after-precipitate in about 75 percent by weight concentrated phosphoric acid containing soluble after-precipitate impurities in an amount of about 2–5 percent solid after-precipitate impurities by weight of the concentrated phosphoric acid, maintaining solid after-precipitate dispersed in the concentrated phosphoric acid for about 10–48 hours to convert in excess of 60% by weight of the soluble after-precipitate in the phosphoric acid to after-precipitate solids, maintaining the temperature of the dispersion of solid after-precipitate in concentrated phosphoric acid during conversion of the soluble form to after-precipitate solids within the range of about 70–95° F., and separating the after-precipitate solids from the purified concentrated phosphoric acid.

3. A continuous process for the purification of concentrated phosphoric acid containing soluble after-precipitate impurities which comprises dispersing solid after-precipitate in a body of 60–85 percent by weight concentrated phosphoric acid containing soluble after-precipitate impurities in an amount of at least one-half percent solid after-precipitate impurities by weight of the concentrated phosphoric acid, continuously feeding concentrated phosphoric acid containing soluble after-precipitate impurities into the body, maintaining solid after-precipitate dispersed in the concentrated phosphoric acid for about 10–48 hours to effect conversion of in excess of 60% by weight of the soluble after-precipitate in the phosphoric acid to the insoluble form, maintaining the concentration of solid after-precipitate in the body during conversion in an amount of at least one-half percent by weight of the phosphoric acid in the body, maintaining the temperature of the body during conversion within the range of about 30–120° F., continuously withdrawing a slurry of dispersed solid after-precipitate in concentrated phosphoric acid from the body in an amount substantially equal to the volume of concentrated phosphoric acid feed introduced into the body, and separating solid after-precipitate from the withdrawn slurry to produce a purified concentrated phosphoric acid.

4. A continuous process for the purification of concentrated phosphoric acid containing soluble after-precipitate impurities which comprises dispersing solid after-precipitate in a body of about 75 percent by weight concentrated phosphoric acid containing soluble after-precipitate impurities in an amount of about 2–5 percent solid after-precipitate impurities by weight of the concentrated phosphoric acid, continuously feeding concentrated phosphoric acid containing soluble after-precipitate impurities into the body, maintaining solid after-precipitate dispersed in the concentrated phosphoric acid for about 20–36 hours to effect conversion of in excess of 60% by weight of the soluble after-precipitate in the phosphoric acid to after-precipitate solids, maintaining the concentration of solid after-precipitate in the body during conversion in an amount of about 2–5 percent by weight of the phosphoric acid in the body, maintaining the temperature of the body during conversion within the range of about 70–95° F., continuously withdrawing a slurry of dispersed solid after-precipitate in concentrated phosphoric acid from the body in an amount substantially equal to the volume of concentrated phosphoric acid feed introduced into the body, and separating solid after-precipitate from the withdrawn slurry to produce a purified concentrated phosphoric acid.

References Cited by the Examiner

UNITED STATES PATENTS

| | | | |
|---|---|---|---|
| Re. 19,045 | 1/34 | Larsson | 23—165 |
| 2,429,316 | 10/46 | Green | 210—46 |
| 2,568,452 | 9/51 | Kelly et al. | 210—46 |
| 2,936,888 | 5/60 | Williams | 23—165 X |

OTHER REFERENCES

Weissberger: "Technique of Organic Chemistry," 2nd ed., vol. 3, Part 1, "Separation and Purification," pages 396–400, Interscience, 1956, New York.

Kolthoff et al.: "Treatise on Analytical Chemistry," Part I, vol. 3, pages 1368, 1382, Interscience, 1961, New York, Part 1, vol. 1, page 758.

MAURICE A. BRINDISI, *Primary Examiner.*